United States Patent Office 2,991,064
Patented July 4, 1961

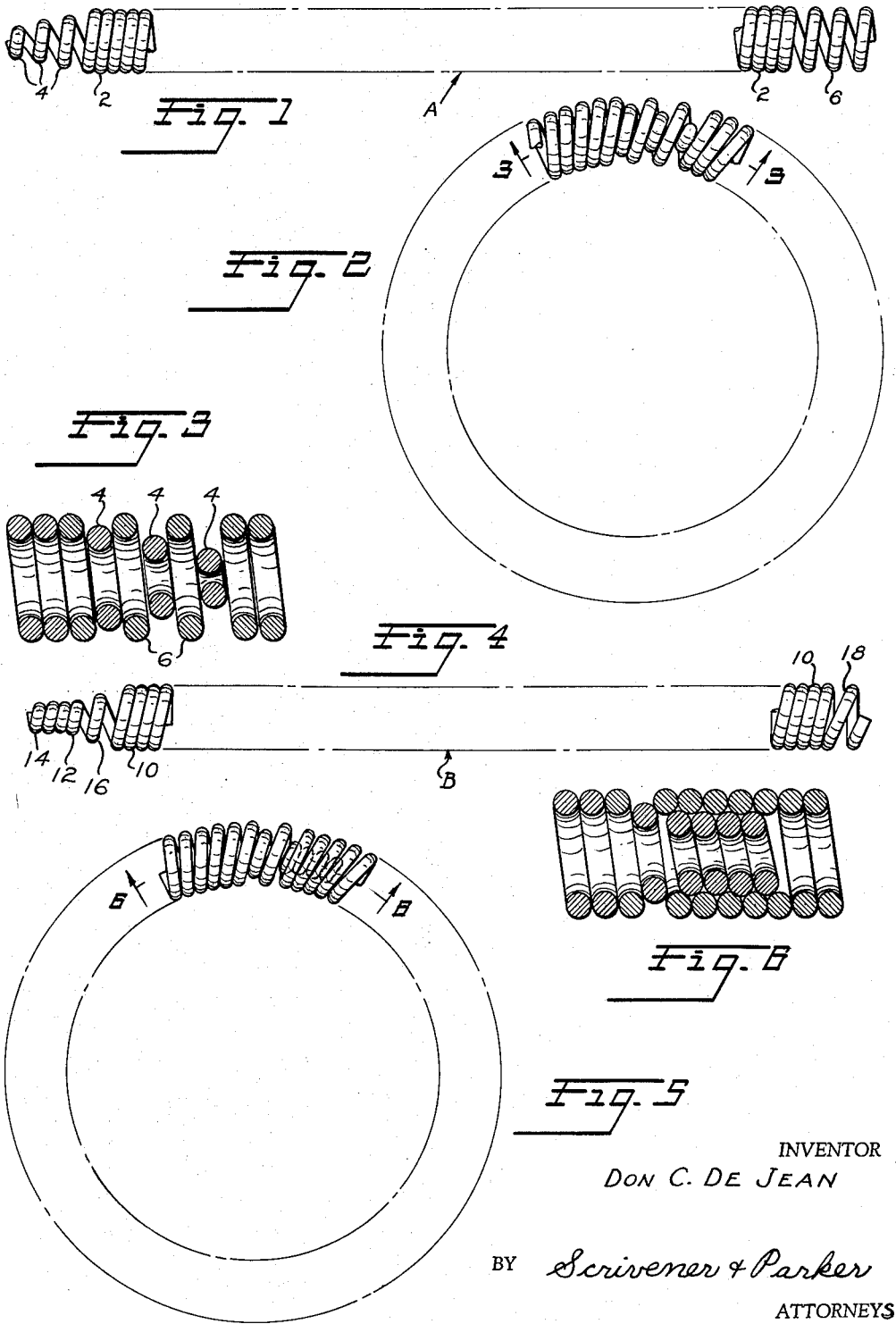

2,991,064
END CONSTRUCTION OF ANNULAR SPRING DEVICE
Don C. De Jean, Dayton, Ohio, assignor to Associated Spring Corporation, Bristol, Conn., a corporation of Delaware
Filed Oct. 5, 1960, Ser. No. 60,666
3 Claims. (Cl. 267—1)

This invention relates broadly to springs and spring devices, and more particularly, to spring devices in the form of a helical spring coil the ends of which are connected together to form an annulus, which type of spring device is useful in many applications such, for example, as garter springs, which are contractile in use, and expander type springs, which exert a radially outward force in use.

In one known method of making such annular spring devices, one end of a helical coil is tapered from the main body of the coil to the end thereof, while the other end is made of constant diameter, and the two ends of this coil are connected by forcing the tapered end into the other, un-tapered end. In another known method, the coil is made of the same diameter throughout its length and the ends are connected by forcing them onto a plug which is received and positioned within the two ends. In another known method, a hook or loop is formed on each end of the helical coil and these are connected in order to form the coil into an annulus. In still another known method, the coil is made of the same diameter throughout its length and one or more convolutions at each end are spaced from each other so that they may be connected by being interwined together to connect the two ends to form the annular spring device. It is well known in the spring making art that all of these known methods have serious disadvantages and that none of them produces an annular spring the ends of which are so firmly connected that the spring will withstand severe vibration and shock without malformation or separation of the ends, or excessive extension or unwinding.

The principal object of this invention is to provide an annular spring device having improved end constructions whereby the ends may be easily connected together, but which are so constructed that they provide a strong and secure connection, which will permit the annular spring to be subjected to severe and continued shock and vibration without malformation, separation of the ends or excessive extension or unwinding. Another object of the invention is to provide a spring device of the described type having ends so constructed that they may be connected merely by holding one end, twisting the other end and inserting it within the held end, and then releasing the twisted end to cause the coils at the two ends to interlock and provide a firm and sure connection which resists unwinding by a grabbing or locking action when any force tending to unwind the ends is exerted on them.

The invention is described in the following specification and is illustrated in the accompanying drawings, in which:

FIG. 1 is a side elevational view of a helical coil having ends formed in accordance with this invention and adapted to be connected to form an annular spring device;

FIG. 2 shows, in part, the annular spring device formed from the helical coil of FIG. 1 and, particularly, shows the interlocked relation of the two ends;

FIG. 3 is a cross sectional view taken on line 3—3 of FIG. 2;

FIG. 4 is a view which is similar to FIG. 1 but which shows a modified form of the invention;

FIG. 5 shows the helical coil of FIG. 4 with its ends connected and interlocked to form an annular spring, and FIG. 6 is a cross sectional view taken on line 6—6 of FIG. 5.

A preferred embodiment of the invention is disclosed in FIGS. 1, 2 and 3 of the drawings and comprises a helical coil A, which is formed of spring wire, piano wire and other suitable material. The convolutions of the main body of this coil may be, but need not be, in abutting relation throughout the entire length of the coil, as shown at 2, and all of the convolutions of the coil may have the same outside diameter except at one end of the coil where, in accordance with one part of the invention, the outside profile of the coil tapers from its outside diameter to a smaller diameter. This convergingly tapered end part of the coil extends over a plurality, preferably about three, convolutions at the end of the coil and the convolutions 4 of this tapering group are spaced apart from each other, and the innermost convolution of the group is spaced from the main, un-tapered part of the coil. The other end of the coil is not tapered but a plurality, preferably the same number as at the tapered end of the coil, and therefore about three, of the convolutions 6 at this end of the coil are spaced apart from each other, the space between adjacent ones of these convolutions being substantially equal to the space between adjacent convolutions at the tapered end of the coil. The spacing of adjacent convolutions at both ends of the coil is slightly less than the diameter of the wire from which the coil is formed.

The coil described above is manufactured in separate straight lengths, and each separate coil is constructed and intended to have its ends connected together, as shown in FIGS. 2 and 3 to form an annular spring, known as a garter spring or expander spring. In accordance with the invention the ends of the coil are connected together by screwing the spaced convolutions of the two ends together, with the tapered end of the coil within the un-tapered end. When this is done the spaced convolutions 4 of the tapered end will be positioned alternately with the spaced convolutions 6 of the untapered end.

As the separation of adjacent convolutions at each end of the coil is less than the diameter of the wire, a tight fit between the alternate inter-engaged convolutions 4, 6 of the two ends will be insured. The taper at the one end of the coil permits that end to be easily inserted within the other end, thus facilitating connection of the two ends. If desired, one end of the coil may be held stationary and the other end twisted, after which the tapered end is inserted into the other end and the twisted end is then released, causing the two ends to rotate relatively to each other to inter-engage their spaced convolutions in the described manner. After the ends are interconnected in this manner any force tending to unscrew the one end from the other will cause a grabbing or locking action to take place, similarly to the action of a one-way clutch spring, thereby preventing separation of the ends.

A second embodiment of the invention is disclosed in FIGS. 4, 5 and 6 of the drawings. In this form of the invention, as in the one described above, a helical coil B is formed by winding spring wire, piano wire or the like in a helix having abutting or spaced convolutions 10 throughout almost all of its length. These convolutions have the same outside diameter except at one end of the coil, where a plurality, about five, of convolutions 12 taper to a smaller diameter. The convolutions 14 at the outer end of this tapered part are in abutting relation and this group of abutting convolutions is connected to the main body of the coil by tapering convolutions 16 which are spaced from each other, there being preferably about four abutting and tapered convolutions and two spaced and tapering convolutions. At the other end of the coil the convolutions are not tapered, but some of the end convolutions 18 are spaced, the number of these being preferably the same as the number of tapered and spaced convolutions at the other end of the coil. The ends of this coil are connected together to form an annular spring device by inserting the tapered end into the un-tapered end and screwing the spaced coils at the tapered end into inter-engaging relation with the spaced coils at the un-tapered end, as shown in FIGS. 5 and 6. The two ends may be connected by holding one of them and twisting the other, after which the tapered end is inserted into the untapered end and the twisted end is then released to cause relative rotation of the two ends and consequent inter-engagement of the spaced coils. As in the other form of the invention, any force tending to unscrew the one end from the other will cause a grabbing or locking action between the interengaged convolutions, preventing any undesired separation of the ends.

While I have described and illustrated two forms which my invention may take, it will be apparent to those skilled in the art that other embodiments, as well as modifications of those disclosed, may be made and practiced without departing in any way from the spirit or scope of the invention, for the limits of which reference must be made to the appended claims.

What is claimed is:

1. A new article of manufacture comprising a helical coil of spring wire having its end parts constructed to be connected together to form an annular spring, a plurality of convolutions at one end of the coil being of the same diameter and being spaced apart from each other, a plurality of convolutions at the other end of the coil being of decreasing diameter from the main body of the coil toward the outer end thereof, the outer tapered convolutions being in abutting relation to each other and the convolutions between said abutting tapered convolutions and the main body of the coil being spaced apart from each other.

2. A new article of manufacture comprising a helical coil of spring wire adapted to have its ends connected to form an annular spring, the coil being of substantially constant outside diameter and adjacent convolutions of the coil being in abutting relation throughout substantially the entire length of the coil, a plurality of convolutions at one end of the coil having the same diameter as those of the main body of the coil but being spaced apart from each other, a plurality of convolutions at the other end of the coil being of progressively decreasing diameter at the other end of the coil to provide a tapered end of the coil, the outer convolutions of said tapered end being in abutting relation and the inner convolutions of said tapered end being spaced apart from each other, the number and spacing of the spaced convolutions at the ends of the coil being substantially the same.

3. An annular spring formed for a helical coil of wire having its ends connected to form the annulus, the convolutions forming such coil having substantially the same outside diameter and being in abutting relation throughout substantially the entire length of the coil, the convolutions at one end of the coil being of decreasing diameter toward that end of the coil and abutting each other, a plurality of tapered and spaced convolutions between said tapered and abutting convolutions and the main body of the coil, the convolutions at the other end of the coil having the same diameter as those of the main body of the coil and being spaced from each other, the tapered end of the coil being positioned within the un-tapered end and the spaced convolutions at the tapered end being interengaged with the spaced convolutions at the un-tapered end.

References Cited in the file of this patent

UNITED STATES PATENTS

| 1,846,257 | Huck | Feb. 23, 1932 |
| 2,028,122 | Floreth | Jan. 14, 1936 |

FOREIGN PATENTS

| 259,851 | Italy | Aug. 25, 1928 |